(12) United States Patent
James et al.

(10) Patent No.: US 10,733,954 B2
(45) Date of Patent: Aug. 4, 2020

(54) METHOD OF PROCESSING DISPLAY DATA

(71) Applicants: Paul James, Bourne-Lincolnshire (GB); Jonathan Jeacocke, Bedford (GB)

(72) Inventors: Paul James, Bourne-Lincolnshire (GB); Jonathan Jeacocke, Bedford (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 0 days.

(21) Appl. No.: 15/559,418

(22) PCT Filed: Mar. 15, 2016

(86) PCT No.: PCT/GB2016/050701
§ 371 (c)(1),
(2) Date: Sep. 18, 2017

(87) PCT Pub. No.: WO2016/146992
PCT Pub. Date: Sep. 22, 2016

(65) Prior Publication Data
US 2018/0090099 A1    Mar. 29, 2018

(30) Foreign Application Priority Data
Mar. 18, 2015 (GB) .................................. 1504596.6

(51) Int. Cl.
*G09G 5/00* (2006.01)
*H04N 19/42* (2014.01)
(Continued)

(52) U.S. Cl.
CPC ............. *G09G 5/006* (2013.01); *G09G 5/003* (2013.01); *G09G 5/395* (2013.01);
(Continued)

(58) Field of Classification Search
CPC .... G09G 5/006; G09G 5/395; G09G 2370/12; G09G 2360/12; G09G 2370/04;
(Continued)

(56) References Cited

U.S. PATENT DOCUMENTS 5,961,617 A    10/1999   Tsang
6,721,952 B1 *  4/2004   Guedalia ........ H04N 21/234318
                                                         348/588

(Continued)

FOREIGN PATENT DOCUMENTS

GB        2 484 736         4/2012

OTHER PUBLICATIONS

Application No. GB1504596.6, Search Report, dated Sep. 16, 2015, 4 pages.
(Continued)

*Primary Examiner* — Tapas Mazumder
(74) *Attorney, Agent, or Firm* — Haynes and Boone, LLP

(57) ABSTRACT

A display control device for outputting display data to frame buffers includes an input for receiving portions of the display data, different portions being in raw form and in compressed form. A data controller determines, for each received portion, whether it is in compressed form or raw form and controls the received portion to move along a first, bypass, path if it is determined that the received portion of display data is in raw form and to control the received portion of display data to move along a second path to a decompression engine if it is determined that the received portion of display data is in compressed form. The decompression engine decompresses the particular portion of compressed display data and forwards a corresponding portion of decompressed display data along a third path, the portions of data from the first and third paths then being output to the frame buffers.

21 Claims, 4 Drawing Sheets

(51) Int. Cl.
*H04N 19/423* (2014.01)
*G09G 5/395* (2006.01)

(52) U.S. Cl.
CPC ....... *H04N 19/423* (2014.11); *G09G 2340/02* (2013.01); *G09G 2350/00* (2013.01); *G09G 2360/12* (2013.01); *G09G 2360/18* (2013.01); *G09G 2370/04* (2013.01); *G09G 2370/10* (2013.01); *G09G 2370/12* (2013.01); *G09G 2370/16* (2013.01)

(58) Field of Classification Search
CPC ........... G09G 2370/10; G09G 2350/00; G09G 2370/16; G09G 2340/02
See application file for complete search history.

(56) References Cited

U.S. PATENT DOCUMENTS

| | | |
|---|---|---|
| 2005/0105125 A1 | 5/2005 | Park et al. |
| 2008/0165081 A1* | 7/2008 | Lawther ................ G06F 3/1423 345/1.2 |
| 2008/0294668 A1* | 11/2008 | Narayanan .............. G06F 21/50 |
| 2009/0002385 A1 | 1/2009 | Blixt |
| 2010/0073574 A1 | 3/2010 | Nakajima et al. |
| 2011/0234608 A1 | 9/2011 | Funada |
| 2012/0200559 A1* | 8/2012 | Ahn ........................ G06T 15/00 345/419 |
| 2014/0098111 A1 | 4/2014 | Ju et al. |
| 2014/0125871 A1* | 5/2014 | Matsubayashi ........ G09G 5/006 348/723 |
| 2014/0354889 A1* | 12/2014 | Matsubayashi ........ G09G 5/006 348/730 |
| 2015/0326695 A1* | 11/2015 | Pang ...................... H04L 69/04 370/477 |
| 2017/0094328 A1* | 3/2017 | Herrmann ............ H04N 21/235 |

OTHER PUBLICATIONS

PCT Search Report, PCT Application No. PCT/GB2016/050701, dated Jun. 3, 2016, 4 pages.

* cited by examiner

METHOD OF PROCESSING DISPLAY DATA

RELATED APPLICATIONS

This application is a U.S. National Stage patent application of International Patent Application No. PCT/GB2016/050701 (filed on Mar. 15, 2016), the benefit of which is claimed, and claims priority to Great Britain Patent Application No. 1504596.6 entitled "A Method of Processing Display Data," which was filed Mar. 18, 2015, each of which are hereby incorporated by reference in their entirety.

TECHNICAL FIELD

This invention relates to a method of processing display data for output to a display device.

BACKGROUND

In desktop computing, it is now common to use more than one display device such as an external monitor or even a projector ("Display"). Traditionally, a user would have a computer with a single Display attached, but now it is possible to have more than one Display attached to the computer, which increases the usable area for the worker. For example, International Patent Application Publication WO 20071020408 discloses a display system comprising a plurality of Displays, each displaying respectively an image; a data processing device connected to each Display and controlling the image displayed by each Display; and a user interface device connected to the data processing device. Connecting multiple Displays to a computer is a proven method for improving productivity.

The connection of an additional Display to a computer presents a number of problems. In general, a computer will be provided with only one video output such as a VGA-out connection. One method by which a Display can be added to a computer is by adding an additional graphics card to the internal components of the computer. The additional graphics card will provide an additional video output which will allow another Display to be connected to the computer and driven by that computer. However, this solution is relatively expensive and is not suitable for many non-technical users of computers.

An alternative method of connecting a Display is to connect the Display to a USB or other general purpose data protocol socket on the computer ("Host") that generates the display data, as all modern computers are provided with multiple USB sockets. This provides a simple connection topology, but requires additional hardware and software (a "Display Control Device") to be present, as in general, USB has a bandwidth that makes the provision of a good quality video output a non-trivial task.

As display technologies improve and the user's desire for display quality increases, the requirements placed upon the Display Control Device that is receiving the incoming display data will correspondingly increase as the amount of display data will increase proportionally. For this reason, combined with limited bandwidth available, for example in a USB connection, it is often necessary to send display data in compressed form. However, compressed data often contains artefacts that become visible on the display device where some data has been lost due to the compression process. Consequently, if there is a reduction in the amount of data being transmitted, for example because the display image is static, it may be beneficial to send uncompressed data—known as 'raw' data—to 'heal' the problematic area of the displayed image.

Some known display systems make use of spatially independent groups of one or more pixels (known as "tiles"). A tile may comprise a single pixel, or may comprise a tile of 2×2, 4×4 or any other appropriate number of pixels. Furthermore, a tile may be rectangular, rather than square in shape. Tiles may be sent as compressed data or as raw data. However, in presently known systems display data of one type must be sent for the whole of a particular frame of the display and the system must reconfigure in order to be able to deal with display data of the other type for another frame.

The present invention aims to reduce or mitigate this problem.

SUMMARY

According to a first aspect of the invention, there is provided a method for processing display data, comprising the steps of:
  receiving portions of display data of a frame of display data, the frame of display data being for display as an image on a display device, wherein at least one received portion of the display data within a frame is in a raw form and at least one received portion of the display data within the frame is in a compressed form;
  determining, for each received portion of display data, whether the received portion of display data is in compressed form or raw form;
  if it is determined that a particular received portion of display data is in raw form, forwarding the particular portion of raw display data along a first path;
  if it is determined that a particular received portion of display data is in compressed form, forwarding the particular portion of compressed display data along a second path:
  decompressing the particular portion of compressed display data forwarded along the second path and forwarding a corresponding portion of decompressed display data along a third path, and
  outputting each of the portions of display data from the first and third paths.

In one preferred embodiment, the method further comprises determining, for each received portion of display data, whether the received portion of display data is in compressed form or raw form comprises determining, from an indication associated with the portion of display data, whether the associated portion of display data is in compressed form or raw form.

Preferably, the received portion of display data is included in a received packet of display data and the indication is in a header of the received packet containing the portion of display data. Alternatively, the indication may be a tag in the portion of display data or may be provided on a signalling channel.

The method preferably further comprises storing the received portions of display data in an input buffer.

In one embodiment, outputting each of the portions of display data from the first and third paths comprises storing the portions of raw display data and the portions of decompressed display data in an output memory.

Preferably, the method further comprises determining, from a header of a received packet containing a portion of display data, one or more output memory addresses at which the portion of display data is to be stored in the output memory; and storing the one or more output memory addresses.

In an embodiment, storing the portions of raw display data and the portions of decompressed display data in an output memory comprises reading the stored one or more output memory addresses at which the portions of display data are to be stored in the output memory; and storing the respective portions of display data at the respective one or more output buffer addresses in the output memory.

Preferably, the output memory comprises one or more frame buffers. Alternatively or additionally, the output memory comprises an output buffer. The portions of display data may be output from the output buffer to one or more frame buffers.

In an embodiment, the portions of display data comprise tiles of display data, a tile comprising display data for one or more pixels. The portions of display data are preferably received in any order.

Preferably, the portions of display data are received over a general purpose connection, which may be a Universal Serial Bus, USB, connection and/or may be a wireless connection.

The compressed form may be one of a plurality of compressed forms, each of the plurality of compressed forms being according to one of a plurality of different predetermined compression algorithms. The method may further comprise receiving information for reprogramming at least part of the decompression engine with a particular decompression algorithm for decompressing one or more particular portions of display data. Each portion of compressed display data is associated with a compression indicator indicating which of the plurality of compressed forms the display data is in. In an embodiment, the method may further comprise determining, from the compression indicator which of the plurality of compressed forms the display data is in, and switching the second path to an appropriate decompression module in the decompression engine depending on which of the plurality of compressed forms the display data is in This allows for displays to heal by replacing compressed display data with raw display data within frames without suffering increased latency due to the need to reconfigure the operating mode of the system. The provision of such a method is beneficial because it allows raw and compressed tiles to be sent in any order, including being interleaved. This means that even if compressed data such as video is being sent by the Host for display alongside a static image such as a text document, if there is any spare bandwidth raw display data can be sent to remove any visual artefacts caused by sending the static image in compressed form. This will be especially useful if only part of a video is actually moving and the static areas can be healed to perfect over time. With known systems it would be impossible to send raw data for the static areas of an image alongside compressed data for the moving areas and embodiments of the invention mitigate or overcome this problem.

Arranging the display data into one or more tiles is beneficial because the tile is an efficient unit for transmission of display data, especially where the data is to be compressed or otherwise processed depending on its location within a displayed image.

Preferably, if the display data is arranged into tiles, there is specifically provided a method for dealing with each tile individually, regardless of whether they are supplied individually. This is beneficial as it accommodates different packet sizes which may allow more than one tile to be sent at a time, where raw and compressed tiles may both be included within a packet in any order.

According to a second aspect of the invention, there is provided a display control device comprising:
  an input for receiving portions of display data of a frame of display data, the frame of display data being for display as an image on a display device, wherein at least one received portion of the display data within a frame is in a raw form and at least one received portion of the display data within the frame is in a compressed form;
  a data controller configured to determine, for each received portion of display data, whether the received portion of display data is in compressed form or raw form and to forward a particular received portion of display data along a first path if it is determined that the received portion of display data is in raw form and to forward a particular received portion of display data along a second path if it is determined that the received portion of display data is in compressed form;
  a decompression engine coupled to the second path and configured to decompress the particular portion of compressed display data and to forwarding a corresponding portion of decompressed display data along a third path; and
  an output for outputting the portions of data from the first and third paths.

The provision of the first path that bypasses the decompression engine is useful to allow the device to process raw and compressed data without requiring a context switch.

In a preferred embodiment, the data controller is configured to determine, for each received portion of display data, from an indication associated with the portion of display data, whether the associated portion of display data is in compressed form or raw form.

Preferably, the received portion of display data is included in a received packet of display data and the indication is included in a header of the received packet, wherein the data controller is configured to determine, from the indication in the header of the received packet containing the portion of display data, whether the received display data is in raw or compressed form. Alternatively, the indication may be a tag in the portion of display data or be provided on a signalling channel.

In one embodiment, the display control device further comprises an input buffer for storing the received portions of display data. This is beneficial as it allows input to be stored before being processed and means that data can be sent to the display control device at any rate at which it is provided by a host device without reference to whether it can be handled immediately.

The data controller is preferably configured to determine, from a header of a received packet containing the portion of display data, one or more output memory addresses at which the portion of display data is to be stored in the output memory, wherein the data controller is configured to store the one or more output memory addresses.

The display control device may further comprise a bypass engine in the first path, the bypass engine configured to read the one or more output memory addresses at which the portion of display data is to be stored in the output memory and to control transfer of the raw display data to the output memory over the first path.

The decompression engine is preferably configured to read the one or more output memory addresses at which the portion of display data is to be stored in the output memory and to control transfer of the decompressed display data to the output memory over the third path In an embodiment, the output memory comprises one or more frame buffers. Alternatively or additionally, the output memory comprises an output buffer.

The display control device may further comprise an output engine configured to read one or more frame buffer addresses at which the portions of display data are to be stored in one or more frame buffers, and to control transfer of the display data from the output buffer to the one or more frame buffer addresses in the one or more frame buffers.

The portions of display data preferably comprise tiles of display data, a tile comprising display data for one or more pixels. Preferably, the portions of display data are received in any order.

In an embodiment, the compressed form may be one of a plurality of compressed forms, each of the plurality of compressed forms being according to one of a plurality of different predetermined compression algorithms. Preferably, the decompression engine is configured to receive information for reprogramming at least part of the decompression engine with a particular decompression algorithm for decompressing one or more particular portions of display data. Each portion of compressed display data may be associated with a compression indicator indicating which of the plurality of compressed forms the display data is in. Preferably, the decompression engine is configured to determine, from the compression indicator which of the plurality of compressed forms the display data is in, and to switch the second path to an appropriate decompression module in the decompression engine depending on which of the plurality of compressed forms the display data is in.

Preferably, the display control device is further arranged to carry out any other processing that may be required, including but not limited to scaling, rotating or converting the display data from a general-purpose format to a display-specific format as appropriate. This would mean that there is no need to provide a second device to perform these functions.

According to a third aspect of the invention, there is provided a display system comprising:
 a host device configured to generate portions of display data of a frame of display data, the frame of display data being for display as an image on a display device, wherein at least one received portion of the display data within a frame is in a raw form and at least one received portion of the display data within the frame is in a compressed form, and an output for outputting the portions of display data;
 a display control device as described above, wherein the input is coupled to the output of the host device; and
 a display device configured to display data on one or more screens, the display device receiving the display data from the one or more frame buffers.

The connections may be wired or wireless, and may comprise general-purpose connections such as USB or Wi-Fi or display-specific connections such as VGA or HDMI. The host device, display control device and the display device may be integral parts of a single device such as a laptop or mobile device or may be separate devices, or the display control device may be integrated into either the host device or the display device.

BRIEF DESCRIPTION OF THE DRAWINGS

An embodiment of the present invention will now be more fully described, by way of example, with reference to the drawings, of which.

DETAILED DESCRIPTION

Figure 1:
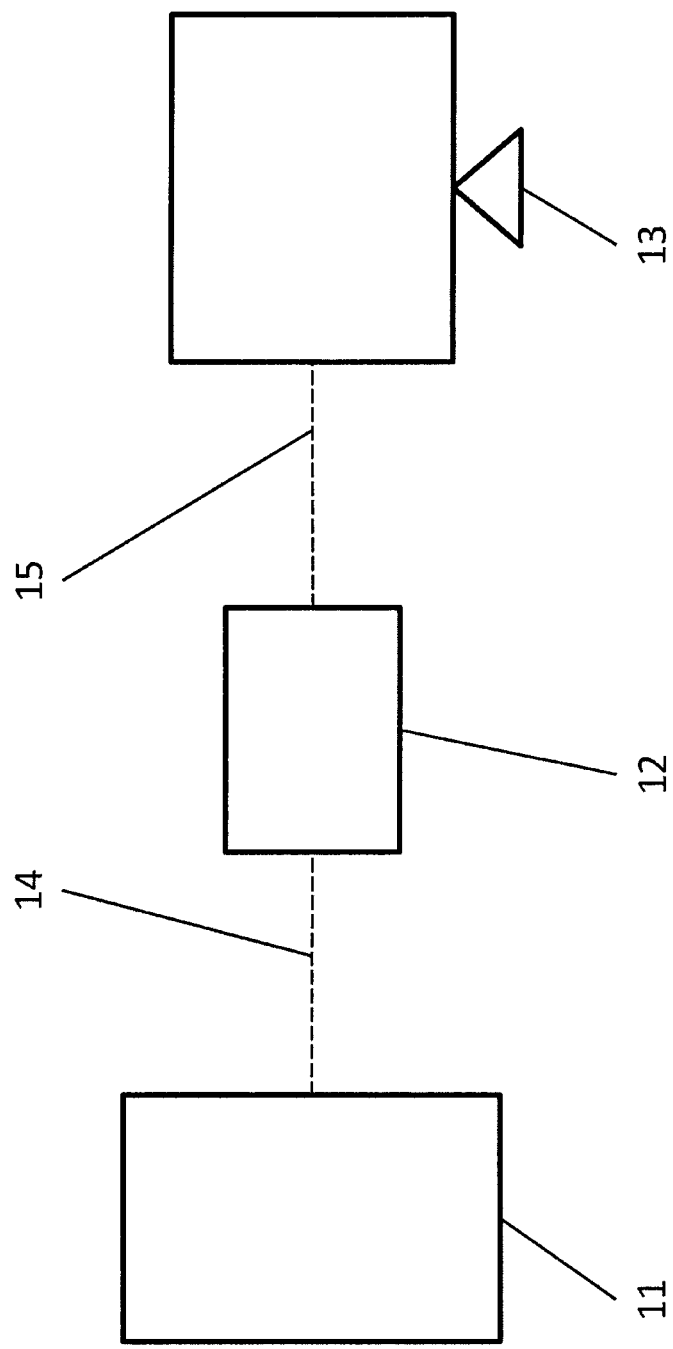
FIG. 1 is a schematic diagram of a display system.

FIG. 1 shows a schematic diagram of a display system comprising a Host [11], a Display Control Device [12] and a Display [13]. In this example, the Host [11] is a desktop computer, but it may be a mobile device or any other device arranged to output display data. The connection [14] between the Host [11] and the Display Control Device [12] is via a general-purpose USB cable. In this example, the display data is arranged in Tiles and sent with one Tile per USB packet, but the display data may be sent in other portions, for example with several portions being contained in one packet, or one portion per packet. The Tiles are then decompressed in the Display Control Device [12] if necessary and converted to a display-specific format, such as HDMI, in order to be sent along the second connection [15], which may comprise an HDMI cable, as a stream of pixel data. At the Display [13], the Tiles are displayed in the conventional way.

Figure 2:
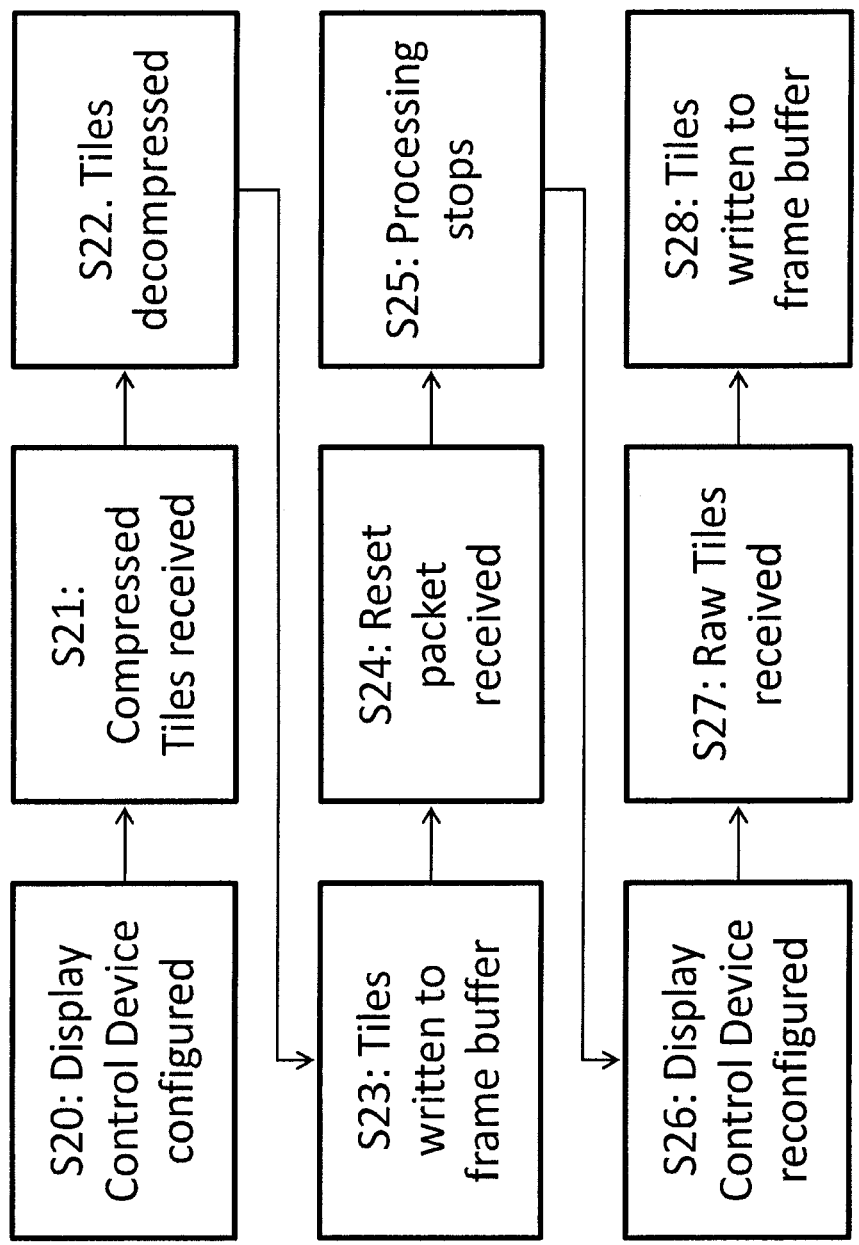
FIG. 2 is a flowchart showing a known process of handling display data.

FIG. 2 shows the known process that takes place at a Display Control Device, such as that shown in FIG. 1. At Step S20, the Display Control Device [12] has been configured to receive and process compressed Tiles. This may occur as a default behaviour on startup, or it may occur in response to a signal from the Host [11]. In a conventional case, the instructions for processing received display data are stored in memory on the Display Control Device [12].

The Display Control Device [12] receives the compressed Tiles at Step S21 and decompresses them at Step S22 according to a stored algorithm. This is a linear process with no decisions necessary, but the Display Control Device can only handle compressed display data, since it has been configured to operate in this mode. Once decompressed, the display data is written to a frame buffer at Step S23 for output to the Display [13]. This process continues until the display data is no longer being produced or the Display Control Device [12] is reconfigured. Although the frame buffer is indicated as being in the Display Control Device [12], it will be apparent that the frame buffer could, alternatively, be incorporated in the Display [13].

At Step S24, the Display Control Device [12] receives a reset packet from the Host [11] which acts as a signal that the Host [11] is going to send uncompressed display data. The Display Control Device [12] finishes processing compressed display data it currently has in progress, but then processing stops (Step S25).

At Step S26, the Display Control Device [12] is reconfigured, copying the instructions for handling compressed display data out of its local memory into storage and instead copying in instructions for dealing with raw display data. This may include shutting down the decompression engine and activating a method for outputting raw display data directly, or it may comprise reconfiguring the decompression engine to perform some other function such as decryption, depending on the exact embodiment. This process is time-consuming as it involves interaction with memory, which is slow.

At Step S27, reconfiguration is complete and the Display Control Device [12] begins to receive raw Tiles. These, of course, do not have to be decompressed and are simply written to the frame buffer at Step S28 for output to the Display [13].

Figure 3:
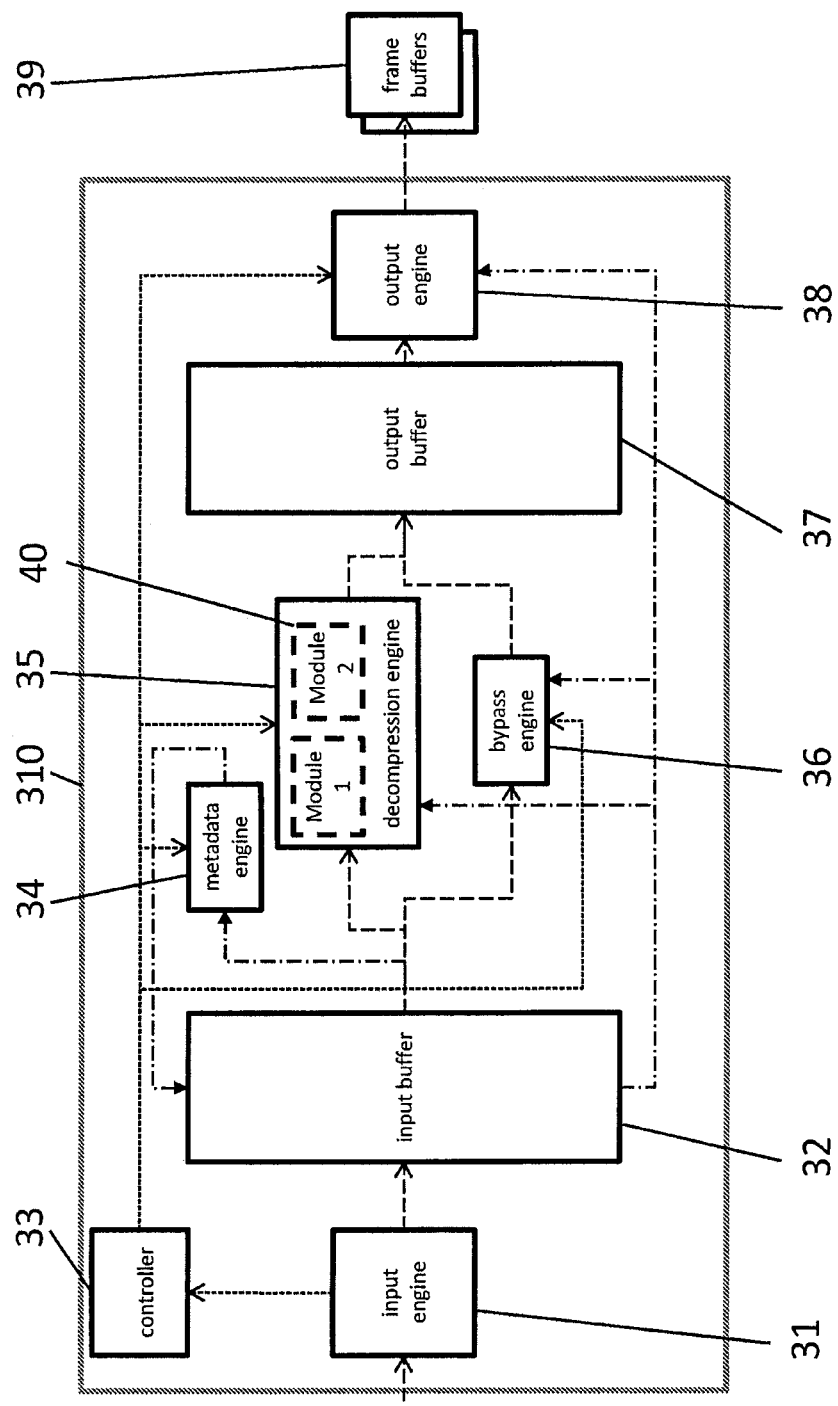
FIG. 3 is an example schematic diagram of a display control device according to an embodiment of the present invention.

FIG. 3 shows a schematic diagram of an embodiment of the Display Control Device [12] according to the invention. It comprises an input engine [31]; an input buffer [32]; a controller [33]; a metadata engine [34]; a decompression engine [35]; a bypass engine [36]; an output buffer [37]; an output engine [38]; and one or more frame buffers [39]. All of the engines and buffers apart from the frame buffers [39] are contained within a processor [310]. There may be multiple such processors [310] within a single Display Control Device [12]. Although there may be multiple frame buffers [39], they will herein be referred to as a single frame buffer [39]. The paths taken by display data through the system are shown by dashed lines, the paths taken by signals are shown by dotted lines and the paths taken by metadata are shown by lines with alternating dots and dashes. The Display Control Device [12] may, of course, also comprise other components, but for clarity these are not shown.

The display data is received, in the form of Tiles (or other portions), from the Host [11] (not shown in FIG. 3), which are received at the input engine [31]. The Host [11] may switch between compressing and sending compressed data and sending it in raw form within a single frame of image data according to whether bandwidth permits, the latency of previously transmitted data, and various other reasons.

Figure 4:
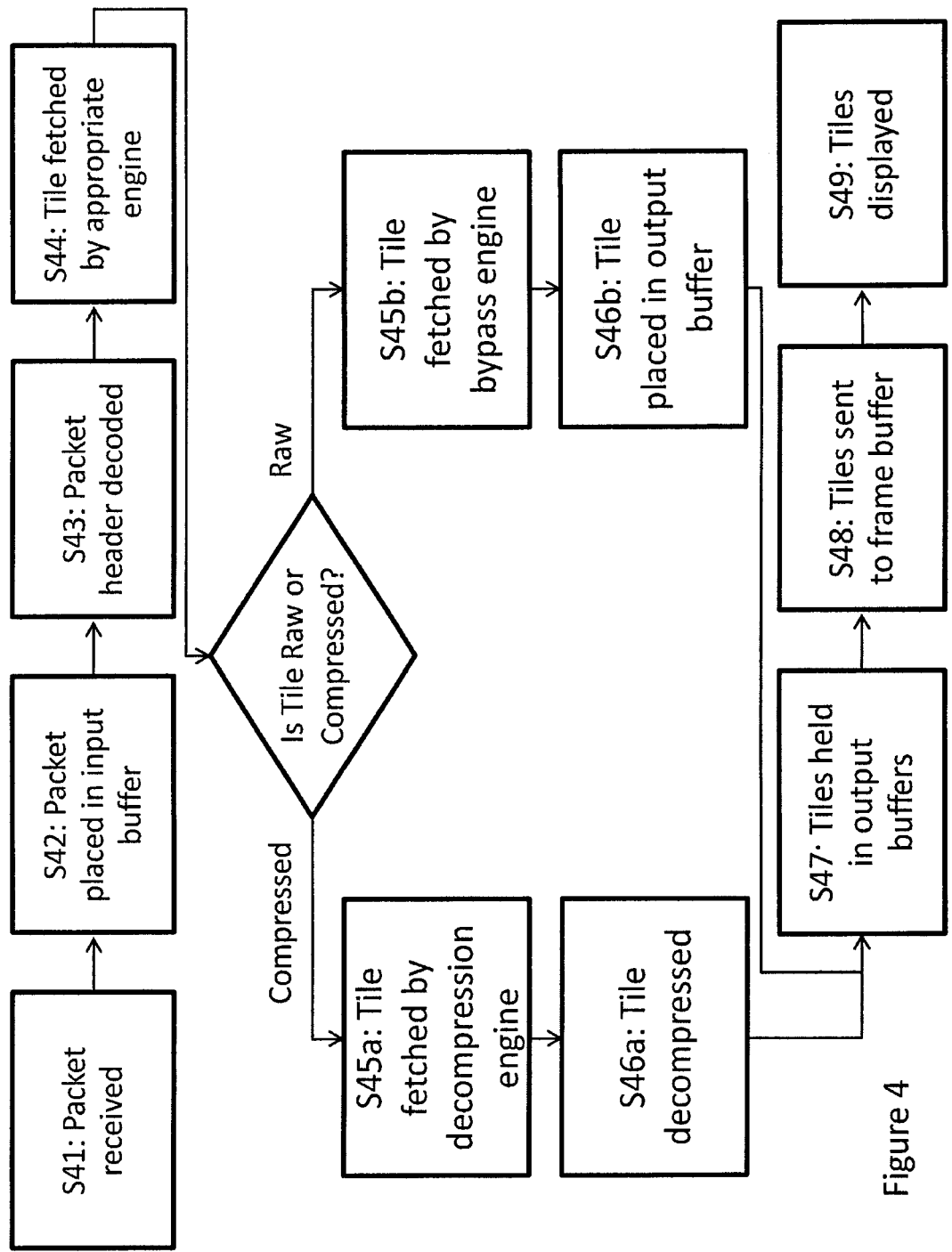
FIG. 4 is a flowchart showing the method of handling display data utilising the display control device of FIG. 3.

FIG. 4 shows the operation of the Display Control Device [12] for processing a Tile passing through the Display Control Device [12] shown in FIG. 3.

At Step S41, a packet of display data comprising one Tile is received by the input engine [31]. It is placed into the input buffer [32] (Step S42) to await processing. The input engine sends a signal to the controller [33] to inform it of the arrival of a packet. The signal includes the position of the packet in the input buffer [32]. In this embodiment, the input buffer [32] is arranged as a FIFO to ensure that the incoming packets are processed in the order of arrival allowing for whether or not they are compressed as described below.

When the controller [33] receives the signal that a new packet has been received and placed in the input buffer [32], it sends a signal to the metadata engine [34] instructing it to decode the metadata attached to the packet (Step S43). This metadata will contain information regarding the position in which the Tile should be placed in the frame buffer [39] and whether or not it is compressed. When the metadata has been decoded, it is placed back in the input buffer [32] in a state in which it can be read by other engines. The metadata may be in the header of the packet, for ease of reading by the metadata engine, or may be located elsewhere in the packet.

The controller [33] is aware, through signals that are not here shown, whether either one of the decompression engine [35] or the bypass engine [36] are idle and also of free space available in the output buffer [38]. When it becomes aware that one of these engines [35, 36] is idle it instructs that engine [35, 36] to fetch the next appropriate Tile from the input buffer [32], assuming that there is space in the output buffer [38]. This means that if the decompression engine [35] is occupied decompressing a complex Tile, raw data can still be sent quickly through the bypass engine [36] without any context switch.

If the Tile is compressed, it is fetched (Step S45a) by the decompression engine [35] and decompressed according to a stored decompression algorithm (Step S46a). It is then copied into a position in the output buffer [38] specified by the metadata read from the input buffer [32].

If the Tile was not compressed, it would instead be fetched (Step S45b) by the bypass engine [36]. The sole function of the bypass engine [36] is to place the Tile in an appropriate position in the output buffer [37] according to the metadata read from the input buffer [32] and no change is made to the Tile (Step S46b).

After this point, the Tiles all go through the same process since they are held in the output buffer [37] in decompressed/raw form (Step S47) regardless of the state in which they were originally received. At Step S8, the controller [23] signals the output engine [38] the order in which Tiles are to be fetched from the output buffer [37], and the addresses in the output buffer [37] where the Tiles are to be found. The output engine reads the metadata in the input buffer [32] indicating the addresses in the one or more frame buffers [39] to which the Tiles are to be written and controls the transfer of the Tiles from the output buffer [37] to the frame buffers [39].

It will be apparent that although the decompression, bypass and output engines in the above embodiment read the metadata indicating the addresses in the output buffer and frame buffer that the data is to be written to, alternatively, the controller [33] could read this metadata and provide it to the appropriate engine when instructing it to fetch the data and to write it to an appropriate buffer.

The Tiles are then output from the frame buffer [39] in a continuous stream of pixel data, which is received by the Display [13] and displayed in the conventional way at Step S49.

It will be appreciated that although only one particular embodiment of the invention has been described in detail, various modifications and improvements can be made by a person skilled in the art without departing from the scope of the present invention, as defined by the attached claims. For example, the decompression engine [35] could include several decompression modules [40], each of which is configured, or programmed, to decompress data according to a particular predetermined compression/decompression algorithm. The input data can have an indicator associated with it, whether in the header of the packet containing the data, contained within the packet, or elsewhere, indicating the particular decompression module or algorithm that should be used to decompress a particular portion of data. The decompression engine can then read that indicator and determine which decompression module is to be used for that particular portion of data. By having programmable modules, one or more such modules could be reprogrammed using downloaded received information regarding a different particular algorithm to be used while other modules are operating on other portions of data according to other predetermined algorithms. Furthermore, although the indication of whether the received Tile contains raw or compressed data has been described as being in the packet (either in the header or elsewhere, such as in the body), this indication may alternatively be sent on a signalling channel to be read by the metadata engine. Although the above described embodiment is illustrated as including an output buffer and one or more frame buffers, it will be apparent that, in some embodiments, the output buffer could be dispensed with and the display data be sent directly to the frame buffers. Furthermore, in some cases, the frame buffers are not needed if the display device can accept the display data on the fly and immediately update the image on the screen as the display data is received without a frame buffer being needed.

What is claimed is:

1. A method for processing display data at a display control device, comprising:

receiving portions of display data of a frame of display data over a bandwidth limited general purpose connection from a host device, the frame of display data being for display as an image on a display device, wherein at least one received portion of the display data within a frame is in a raw form and at least one received portion of the display data within the frame is in a compressed form and can be received and decompressed independently of any other received portion;

determining, for each received portion of display data and from an indication associated with the portion of the display data, whether the received portion of display data is in compressed form or raw form;

if it is determined that a particular received portion of display data is in raw form, forwarding the particular received portion of raw display data along a first path;

if it is determined that a particular received portion of display data is in compressed form, forwarding the particular received portion of compressed display data along a second path:

decompressing the particular received portion of compressed display data forwarded along the second path and forwarding a corresponding portion of decompressed display data along a third path, and outputting each of the portions of display data from the first and third paths;

wherein the portions of display data comprise tiles of display data, a tile comprising display data for one or more pixels and wherein the portions of display data are received in any order, and wherein a plurality of tiles forms a frame of the image.

2. The method of claim 1, wherein the received portion of display data is included in a received packet of display data and the indication is in a header of the received packet containing the portion of display data.

3. The method of claim 1, wherein the indication is a tag in the portion of display data or is provided on a signaling channel.

4. The method of claim 1, wherein outputting each of the portions of display data from the first and third paths comprises storing the portions of raw display data and the portions of decompressed display data in an output memory.

5. The method of claim 4, further comprising:

determining, from a header of a received packet containing a portion of display data, one or more output memory addresses at which the portion of display data is to be stored in the output memory; and storing the one or more output memory addresses.

6. The method of claim 5, wherein storing the portions of raw display data and the portions of decompressed display data in an output memory comprises reading the stored one or more output memory addresses at which the portions of display data are to be stored in the output memory; and storing the respective portions of display data at the respective one or more output memory addresses in the output memory.

7. The method of claim 1, wherein the general purpose connection is a Universal Serial Bus (USB) connection and/or a wireless connection.

8. The method of claim 1, wherein the compressed form may be one of a plurality of compressed forms, each of the plurality of compressed forms being according to one of a plurality of different predetermined compression algorithms, wherein each portion of compressed display data is associated with a compression indicator indicating which of the plurality of compressed forms the display data is in.

9. The method of claim 8, further comprising receiving information for reprogramming at least part of a decompression engine with a particular decompression algorithm for decompressing one or more particular portions of display data.

10. The method of claim 8, further comprising determining, from the compression indicator which of the plurality of compressed forms the display data is in, and switching the second path to an appropriate decompression module in a decompression engine depending on which of the plurality of compressed forms the display data is in.

11. A display control device comprising:

an input for receiving portions of display data of a frame of display data over a bandwidth limited general purpose connection from a host device, the frame of display data being for display as an image on a display device, wherein at least one received portion of the display data within a frame is in a raw form and at least one received portion of the display data within the frame is in a compressed form and can be received and decompressed independently of any other received portion;

a data controller configured to determine, for each received portion of display data and from an indication associated with the portion of the display data, whether the received portion of display data is in compressed form or raw form and to control a particular received portion of display data to move along a first path if it is determined that the received portion of display data is in raw form and to control a particular received portion of display data to move along a second path if it is determined that the received portion of display data is in compressed form;

a decompression engine coupled to the second path and configured to decompress the particular received portion of compressed display data and to forward a corresponding portion of decompressed display data along a third path; and an output for outputting the portions of display data from the first and third paths;

wherein the portions of display data comprise tiles of display data, a tile comprising display data for one or more pixels and wherein the portions of display data are received in any order, and wherein a plurality of tiles forms a frame of the image.

12. The display control device of claim 11, wherein the received portion of display data is included in a received packet of display data and the indication is included in a header of the received packet, wherein the data controller is configured to determine, from the indication in the header of the received packet containing the portion of display data, whether the received display data is in raw or compressed form.

13. The display control device of claim 11, wherein the indication is a tag in the portion of display data or is provided on a signaling channel.

14. The display control device of claim 11, further comprising an output memory in which each of the portions of display data from the first and third paths are stored.

15. The display control device of claim 14, wherein the data controller is configured to determine, from a header of a received packet containing the portion of display data, one or more output memory addresses at which the portion of display data is to be stored in the output memory, wherein the data controller is configured to store the one or more output memory addresses.

16. The display control device of claim 15, further comprising a bypass engine in the first path, the bypass engine configured to read the one or more output memory addresses at which the portion of display data is to be stored in the output memory and to control transfer of the raw display data to the output memory over the first path, wherein the decompression engine is configured to read the one or more output memory addresses at which the portion of display data is to be stored in the output memory and to control transfer of the decompressed display data to the output memory over the third path.

17. The display control device of claim 11, wherein the compressed form may be one of a plurality of compressed forms, each of the plurality of compressed forms being according to one of a plurality of different predetermined compression algorithms, and wherein each portion of compressed display data is associated with a compression indicator indicating which of the plurality of compressed forms the display data is in.

18. The display control device of claim 17, wherein the decompression engine is configured to receive information for reprogramming at least part of the decompression engine with a particular decompression algorithm for decompressing one or more particular portions of display data.

19. The display control device of claim 17, wherein the decompression engine is configured to determine, from the compression indicator which of the plurality of compressed forms the display data is in, and to switch the second path to an appropriate decompression module in the decompression engine depending on which of the plurality of compressed forms the display data is in.

20. A display system comprising:
  a host device configured to generate portions of display data of a frame of display data, the frame of display data being for display as an image on a display device, wherein at least one received portion of the display data within a frame is in a raw form and at least one received portion of the display data within the frame is in a compressed form and can be received and decompressed independently of any other received portion, and an output for outputting the portions of display data to a bandwidth limited general purpose connection;
  a display control device according to claim 11, wherein the input is coupled to receive the portions of display data output from the host device over the bandwidth limited general purpose connection from the host device; and
  a display device configured to display frames of display data on one or more screens, the display device receiving the frames of display data from the display control device.

21. The display system of claim 20, wherein the general purpose connection is a Universal Serial Bus, USB, connection and/or a wireless connection.

* * * * *